C. L. KNOWLES.
TIRE CHAIN FASTENER.
APPLICATION FILED APR. 16, 1921.
1,419,060.
Patented June 6, 1922.
Fig. 1,
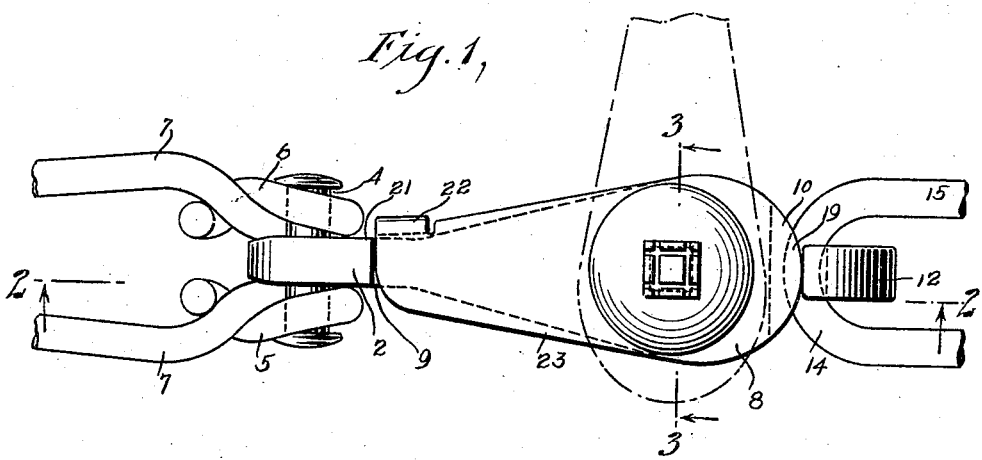
Fig. 2,
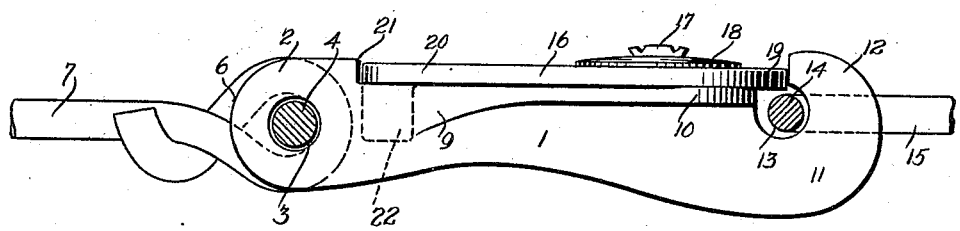
Fig. 3.
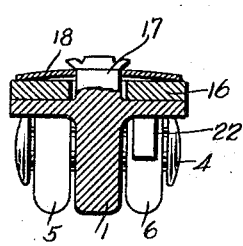
WITNESSES
Edw. Thorpe
Robert D. Hulsizer
INVENTOR
Charles L. Knowles
BY
ATTORNEYS

UNITED STATES PATENT OFFICE.

CHARLES L. KNOWLES, OF KINGSLEY, IOWA.

TIRE-CHAIN FASTENER.

1,419,060.  Specification of Letters Patent.  Patented June 6, 1922.

Application filed April 16, 1921. Serial No. 461,920.

*To all whom it may concern:*

Be it known that I, CHARLES L. KNOWLES, a citizen of the United States, and a resident of Kingsley, in the county of Plymouth and State of Iowa, have invented a new and Improved Tire-Chain Fastener, of which the following is a full, clear, and exact description.

This invention relates to fasteners, and has particular reference to fasteners for automobile tire chains.

An object of the invention is to provide a fastener by means of which an anti-skid chain may be quickly attached to an automobile with a minimum expenditure of time and labor.

Another object resides in the construction of the parts of the fastener which causes it to be locked tighter as the speed of the automobile increases.

A further object resides in the provision of a fastener made of a minimum number of parts and in the most economical manner.

A still further object resides in the particular construction and arrangement of parts hereinafter described and claimed and shown in the accompanying drawings.

The invention is shown in the drawings, of which—

Figure 1 is a plan view of the fastener attached to a portion of a chain;

Figure 2 is a side elevation of the device; and

Figure 3 is a section taken on the line 3—3 of Figure 1.

The preferred embodiment of my invention, as shown in the drawings, is adapted to be attached to an automobile tire chain. The fastener comprises a fastener link having a body portion 1 in the form of a long, narrow link one end 2 of which is apertured, as at 3, to receive a pivot pin, such as 4. The pin 4 is long enough to also receive the ends 5 and 6 of an adjacent chain link 7. These ends 5 and 6 are looped over the ends of the pin 4, as shown.

Along one edge of the body portion 1, I provide a horizontally extending flange portion 8 adapted to form a seat. This seat portion tapers from a narrow portion 9 near the end 2 to a wide portion 10 near the opposite end 11. This end 11 is curved around as at 12, and its outer end is curved back adjacent but spaced from the large end of the seat 8. Herein is formed a recess 13 to receive the end portion 14 of a link 15. It is apparent, therefore, that the end 12 is in the form of a hook portion spaced from the adjacent end of the body portion to receive the link 15.

To effectively close the opening of the recess 13 in which the end of link 15 is held, I provide a movable latch mechanism in the form of a cam member 16 which is pivoted on the upper surface of the seat 10. The pivot point is in the form of an integral rivet 17 which is formed with the body portion 1. Over the top of the cam member 16 is placed a spring washer 18 after which the rivet 17 is then swaged over to hold the washer and the cam member in place. When the cam member is in the position shown in full lines in Fig. 1, the end surface 19 thereof extends across the opening of recess 13 to close the same. In this position the other end 20 of the cam member, which acts as a handle portion, lies adjacent a shoulder 21 on the end 2 of the body portion. A downwardly extending flange portion 22 acts as a stop to limit the motion of the handle portion in one direction.

When this fastener is used in connection with automobile tire chains, the fastener is so arranged that the edge 23, as seen in Fig. 1, lies adjacent the outer rim of the tire. In this position the centrifugal force of the wheel will force the handle portion 20 to remain fastened. It will also be observed that the cam member will always partially or completely close the opening to recess 13 except when the member is in the position shown in dotted line in Fig. 1. Therefore, if the cam member is loose enough to work loose, it is very unlikely that it would stay in this one position long enough to release the link 15.

It will be observed that this device is composed of a minimum number of parts, simple in assembly and construction and one in which the operating elements are very rigidly aligned and related.

Minor modifications may, of course be made in the construction and arrangement of the parts without departing from the spirit of the invention.

What I claim is:—

1. A fastening device which comprises a body portion, an integral rivet projecting therefrom, a cam member pivoted on said rivet, a spring washer on said pivoted member, said rivet being swaged over the spring washer when the parts are assembled, and a curved hook formed on one end of the body portion and forming a recess between itself and the adjacent part of the body portion, the end of the hook being disposed substantially in the plane of the cam member to form a passage which is closed in a certain position of the cam member.

2. A fastening device which comprises a body portion, a flat seat on the upper edge thereof, a pivoted cam member mounted on the seat, a handle portion to said cam member, a depending flange on the handle portion to engage an edge of the body portion in a predetermined position of the handle to limit the movement of the cam member, a curved hook formed on one end of the body portion and bent to form a recess between itself and the adjacent part of the body portion, the end of the hook being disposed substantially in the plane of the cam member and spaced from the body portion to form a passage which is closed by the cam member when the cam member is disposed in a definite position.

CHARLES L. KNOWLES.